United States Patent
Wey

(10) Patent No.: US 11,525,706 B1
(45) Date of Patent: Dec. 13, 2022

(54) ROTATIONAL SPEED AND POSITION SENSOR ARRANGEMENT WITH TWO SENSORS AND AN AXIAL FACE DISC TARGET

(71) Applicant: Schaeffler Technologies AG & Co. KG, Herzogenaurach (DE)

(72) Inventor: Edward J. Wey, Waxhaw, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/500,413

(22) Filed: Oct. 13, 2021

(51) Int. Cl.
*G01D 5/245* (2006.01)

(52) U.S. Cl.
CPC .................................. *G01D 5/245* (2013.01)

(58) Field of Classification Search
CPC . G01D 5/12–2525; G01R 33/00; G01R 33/02
See application file for complete search history.

(56) References Cited

U.S. PATENT DOCUMENTS

| | | | |
|---|---|---|---|
| 6,036,370 A | 4/2000 | Kessen et al. | |
| 8,253,413 B2 | 8/2012 | Hammerschmidt | |
| 9,389,098 B2 * | 7/2016 | Hammerschmidt | G01R 33/093 |
| 9,810,519 B2 * | 11/2017 | Taylor | G01R 33/06 |
| 2015/0176962 A1 | 6/2015 | Kardraon | |
| 2017/0314907 A1 | 11/2017 | Taylor | |
| 2020/0041310 A1 * | 2/2020 | Lassalle-Balier | G01R 33/0094 |

* cited by examiner

*Primary Examiner* — Huy Q Phan
*Assistant Examiner* — David B Frederiksen
(74) *Attorney, Agent, or Firm* — Volpe Koenig

(57) ABSTRACT

A rotational position sensor arrangement having first and second sensors positioned adjacent to first and second axial faces or a first axial face and a radial face of a target disc. The target disc has first and second wave profiles on the first axial face and the second axial or radial face, having respectively, first and second pluralities of segments, with each segment being formed with axially offset peaks and valleys which extend along radial lines/planes. The valleys separate the segments, and the number of the first plurality of segments is different than that of the second plurality of segments. The first and second sensors signal a controller with data on a field variance due to a difference in at least one of a size or location of the first and second wave profiles as they pass the first and second sensors to determine a rotational speed and/or position.

15 Claims, 4 Drawing Sheets

ROTATIONAL SPEED AND POSITION SENSOR ARRANGEMENT WITH TWO SENSORS AND AN AXIAL FACE DISC TARGET

TECHNICAL FIELD

The present disclosure relates to a rotational speed and/or position sensor for a shaft, and in particular to a rotational speed and/or position sensor for a shaft or a bearing ring that supports a shaft. One preferred use is a speed and/or rotational position sensor for an e-motor of a hybrid drive.

BACKGROUND

Rotational speed and/or position sensors are known in many applications. One application of particular interest is for use in electric drive units for electric and hybrid-electric vehicles. Here, the vehicle control unit must know the rotational position of the electric motor shaft, even at rest before the motor begins to rotate, as well as during rotation.

Resolver type sensors have been known for use in monitoring the rotational position of motor shafts for vehicles that have an electric motor. These sensors have proven to be robust, but they are also relatively high in cost.

Sensors that utilize a magnetic ring or "mag rings" for a target are a more cost-effective solution that can sometimes be used. However, such sensors have the disadvantage that the magnetic ring can attract and conglomerate iron particles that come from wear of certain parts, and these particles may eventually break free and contaminate an associated bearing in a more concentrated manner than with the normal lubrication flow.

Other proposed solutions use a target sensor wheel connected to a shaft having a wave profile on a radially outer surface, such as in U.S. Pat. No. 6,036,370. However, the accuracy provided by this type of single target disc is limited, and for higher accuracy rotational angle and/or position measurement, additional axial space is required.

Other known rotational position sensors have used targets with a variety of profiles (wave, square tooth, "window" (similar to a needle bearing cage), etc.) for many years. The combinations of these types of sensors/targets have generally been used to monitor the speed and direction of the shaft. However, using this type of "low tech" approach to accurately monitor the actual rotational position of an electric motor for vehicle drive applications at any given time has proved challenging, particularly where axial space is at a premium, such as in vehicle drive systems.

SUMMARY

In one aspect, a rotational position sensor arrangement is provided having first and second sensors and a target disc having a rotation axis and being formed of a metallic material. The target disc includes a first wave profile located on a first axial face thereof, with the first wave profile including a first plurality of segments, each having a first axially offset peak located on a radial line extending from the axis and first valleys located along radial lines extending from the axis on each side of the first peak. The first valleys define boundaries between the first plurality of segments. A second wave profile is located on one of a second axial face or a radial face of the target disc, with the second wave profile including a second plurality of segments, each having a second axially offset peak located on a radial plane extending from the axis and second valleys located along radial planes extending from the axis on each side of the second peak. The second valleys define boundaries between the second plurality of segments. The first sensor is located adjacent to the first wave profile and the second sensor is located adjacent to the second wave profile. A controller is connected to the first and second sensors and is configured to provide a rotational position of the target disc based on the respective first and second wave profiles altering a magnetic field of each of the first and second sensors that provide out-of-phase signals to the controller.

The first and second sensors can be inductive sensors, Hall effect sensors, TMR (Tunnel Magneto Resistance) sensors, or any other suitable sensor that detects a change in a magnetic field based on a metallic target with a changing profile being in the field.

In one arrangement, the first and second sensors are offset in a circumferential direction. Alternatively, the first and second sensors can be aligned in a circumferential direction.

In another aspect, the controller is configured to read a first chord length between two adjacent ones of the respective first valleys based on the signals from the first sensor, and the controller is further configured to read a second chord length between two adjacent ones of the respective second valleys based on signals from the second sensor.

Preferably, the controller is further configured to determine a speed and direction of rotation of the target disc. This can be done based on a different number of the first and second segments and/or different segment forms so that the out-of-phase signals from the first and second sensors provide characteristic position information to the controller that can calculate the target disc position as well as changes in the target disc position per unit time.

In one arrangement, a number of the second plurality of segments is different from a number of the first plurality of segments. Alternatively, the number of the second plurality of segments can be the same as the number of the first plurality of segments In one arrangement, a height of the second plurality of segments is different from a height of the first plurality of segments. Alternatively, the heights could be equal.

In another aspect, the arrangement can include a third wave profile located on the other of the second axial face or the radial face of the target disc from the second wave profile. The third wave profile includes a third plurality of segments, each having a third axially offset peak located on a radial plane extending from the axis and third valleys located along radial planes extending from the axis on each side of the third peak. The third valleys define boundaries between the third plurality of segments. A third sensor is located adjacent to the third wave profile, and the third sensor is connected to the controller. Providing this arrangement allows for increased accuracy in determining an angular position with a simple disc design.

In one arrangement, a number of the third plurality of segments is different than a number of the first plurality of segments or a number of the second plurality of segments. Alternatively, a number of the third plurality of segments is different than a number of the first plurality of segments and a number of the second plurality of segments.

In another aspect, a method of detecting a rotational angle position of at least one shaft or bearing ring using the rotational position sensor arrangement as described herein is provided. The method includes providing at least one shaft or bearing ring, connecting the target disc to the at least one shaft or bearing ring, aligning the first and second sensors adjacent to respective ones of the first wave profile and the second wave profile, and detecting a rotational angle position of the at least one shaft or bearing ring based on a field variance due to a difference in at least one of a size or location of the first and second wave profiles as they pass the first and second sensors.

In another aspect of the method, the controller determines a respective chord length between adjacent ones of the valleys in each of the first and second wave profiles; and the controller determines the rotational angle position of the at least one shaft or bearing ring based on a differential between the chord lengths.

In one application, the determining of the rotational angle position is for a rotor of an e-motor for a motor vehicle.

The method may further include that a number of the second plurality of segments is different from a number of the first plurality of segments, and the controller determines the rotational angle position, a speed, and a direction of rotation of the at least one shaft or bearing ring.

In a further aspect of the method, a third wave profile is located on the other of the second axial face or the radial face of the target disc from the second wave profile, the third wave profile including a third plurality of segments, each having a third axially offset peak located on a radial plane extending from the axis and third valleys located along radial planes extending from the axis on each side of the third peak, the third valleys define boundaries between the third plurality of segments, and a third sensor is located adjacent to the third wave profile. The third wave profile alters a magnetic field of the third sensor to provide a further out-of-phase signal to the controller for enhanced determination of position and/or speed.

Various aspects and features disclosed herein can be implemented individually or in combination with other aspects and features depending on the particular application and space requirements.

BRIEF DESCRIPTION OF THE DRAWINGS

The foregoing Summary and the following detailed description will be better understood when read in conjunction with the appended drawings, which illustrate preferred embodiments according to the disclosure. In the drawings.

DETAILED DESCRIPTION

Figure 1:
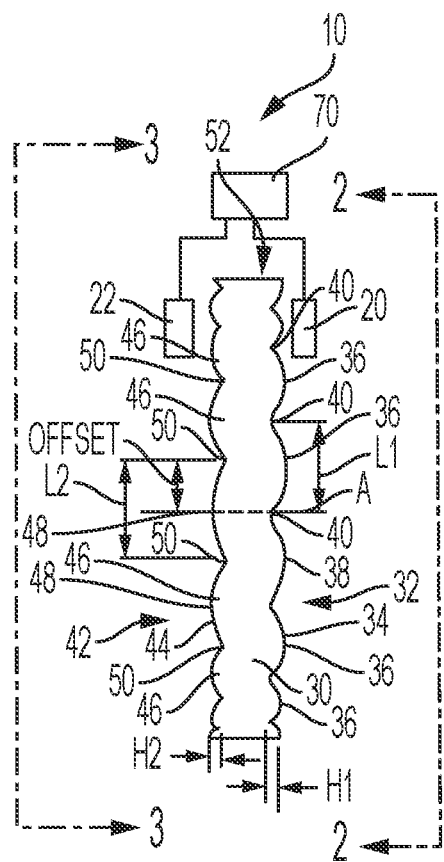
FIG. 1 is a side elevational view of a first embodiment of a rotational position sensor arrangement.

Certain terminology is used in the following description for convenience only and is not limiting. The words "inwardly" and "outwardly" refer to directions toward and away from the parts referenced in the drawings. "Axially" refers to a direction along the axis of a shaft. "Radially" refers to a direction normal to an axis. A reference to a list of items that are cited as, for example, "at least one of a or b" (where a and b represent the items being listed) means any single one of the items a or b, or a combination of a and b thereof. This would also apply to lists of three or more items in like manner so that individual ones of the items or combinations thereof are included. The terms "about" and "approximately" encompass + or −10% of an indicated value unless otherwise noted. The terminology includes the words specifically noted above, derivatives thereof and words of similar import.

Figure 2:
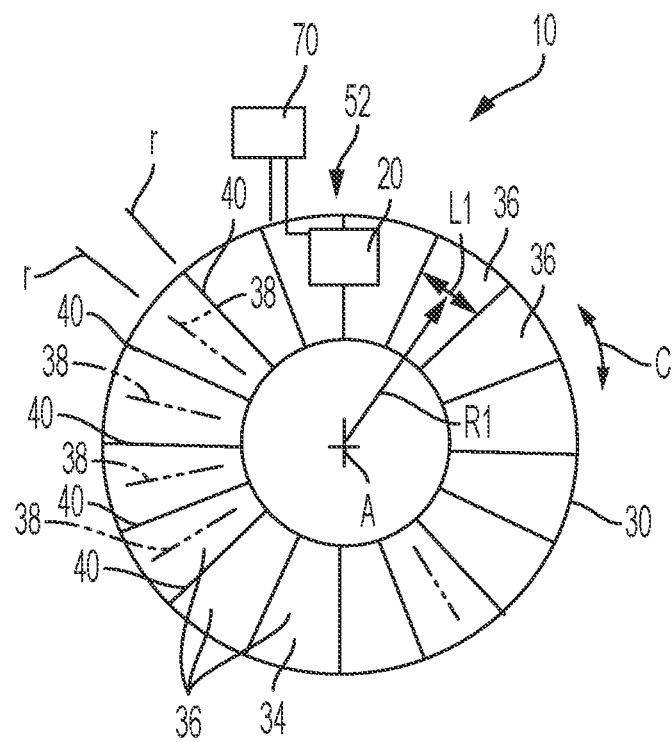
FIG. 2 is a view of a first axial face of the sensor arrangement taken along lines 2-2 in FIG. 1.
Figure 3:
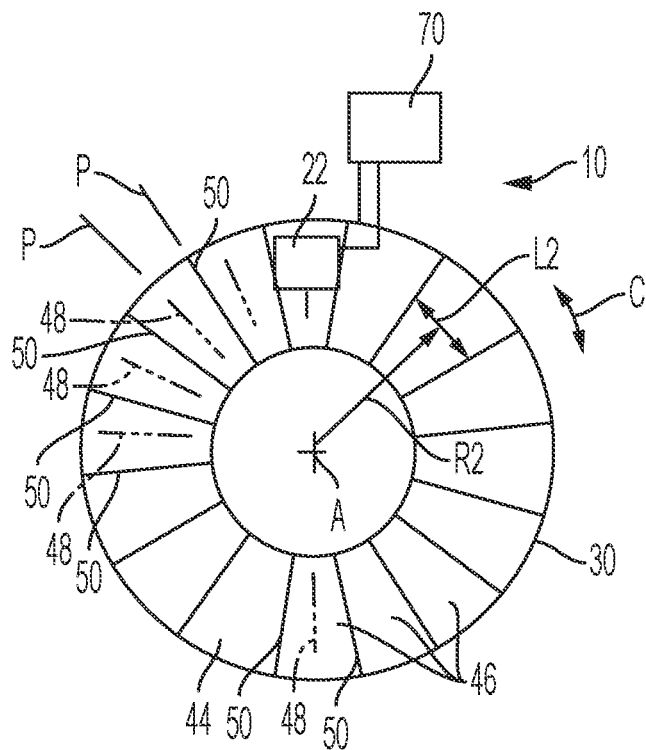
FIG. 3 is a view of a second axial face of the sensor arrangement taken along lines 3-3 in FIG. 1.

Referring to FIGS. 1-3, a rotational position sensor arrangement 10 is shown. The rotational position sensor arrangement 10, which can detect both a rotational position as well as a rotational speed and direction, includes first and second sensors 20, 22 that are positioned on opposite axial sides of a target disc 30. The target disc 30 has a rotational axis, indicated as A, and is formed of a metallic material.

The target disc 30 includes a first wave profile 34 located on a first axial face 32, shown in detail in FIG. 2, which includes a first plurality of segments 36, each having a first axially offset peak 38 located on a radial line r, extending from the axis A, and first valleys 40 located along radially lines r, extending from the axis A on each side of the first peak 38. The first valleys 40 define boundaries between the first plurality of segments 36. The first axially offset peaks 38 are only shown for some of the segments 36, with it being understood that each of the segments 36 includes an axial peak 38.

This arrangement of the first wave profile 34 can be a sine-wave or modified sine-wave configuration. Other arrangements which are stepped could also be provided. Further, the segments 36 do not need to be the same size and both the size and spacing of the segments 36 can be varied.

Still with reference to FIGS. 1-3, a second wave profile 44 is located on a second axial face 42 or a radial face 52 of the target disc 30. In this first embodiment, the second wave profile 44 is located on the second axial face 42 of the target disc 30, while the in the second embodiment as explained in further detail below, the alternate arrangement is disclosed. Here, the second wave profile 44 includes a second plurality of segments 46, each having a second axially offset peak 48 located on a radial plane P indicated in FIG. 3 which would extend into and out of the plane of the drawing, that extends from the axis A, as well as second valleys 50 located along radial planes P extending from the axis A on each side of the second peak 48. The second valleys 50 define boundaries between the second plurality of segments 46.

Still with reference to FIGS. 1-3, the first sensor 20 is located adjacent to the first wave profile 34 and the second sensor 22 is located adjacent to the second wave profile 44. A controller 70 is connected to the first and second sensors 20, 22, and is configured to provide a rotational position of the target disc 30 based on the respective first and second wave profiles 34, 44 altering a magnetic field of each of the first and second sensors 20, 22 that provide out-of-phase signals to the controller 70. A rotational speed can also be provided.

In the illustrated embodiment, the second plurality of segments 46 of the second wave profile 44 are out of phase with the first plurality of segments 36 of the first wave profile 34. This can be seen by comparing FIGS. 2 and 3. In the illustrated arrangement, a number of the second plurality of segments 46 is the same as a number of the first plurality of segments 36. Alternatively, the number of the second plurality of segments 46 can be different from the number of the first plurality of segments 36. It is also possible for the height H2 of the second plurality of segments 46 to be different from a height H1 of the first plurality of segments 36, although this height could be the same. In the case where the number of second plurality of segments 46 is the same as the number of the first plurality of segments 36, it is possible for the cord lengths L1, L2 where the first and second seconds 20, 22 are located to be different by offsetting the radial distance R1, R2 of each of the sensors 20, 22, respectively from the axis A.

In addition to the sensors 20, 22 being able to be located at different radial distances R1, R2 from the axis A, it is also possible for the first and second sensors 20, 22 to be offset in a circumferential direction C, depending upon the available space in which the sensors 20, 22 are positioned. Alternatively, the first and second sensors 20, 22 may be aligned in a circumferential direction C.

In one embodiment, the controller 70 is configured to read a first cord length L1 between two adjacent ones of the respective first valleys 40 based on signals from the first sensor 20, and the controller 70 is further configured to read a second cord length L2 between two adjacent ones of the respective second valleys 50 based on signals from the second sensor 22.

Depending upon the differences in configuration of the first wave profile 34 and the second wave profile 44, based on either a different number of a first plurality of segments 36 from the second plurality of segments 46 or different profiles, in addition to the position, the rotational position sensor arrangement 10 can determine both a speed and direction of rotation of the target disc 30 based on the out-of-phase signals from the first and second sensors 20, 22.

Figure 4:
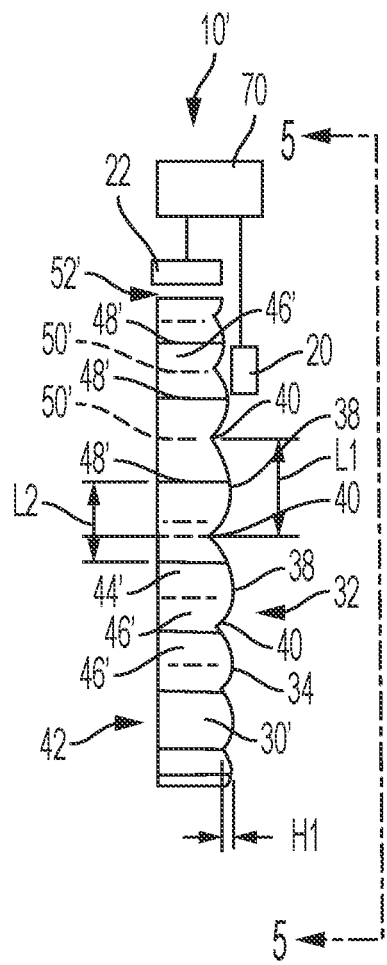
FIG. 4 is a side elevational view of a second embodiment of a rotational position sensor arrangement.
Figure 5:
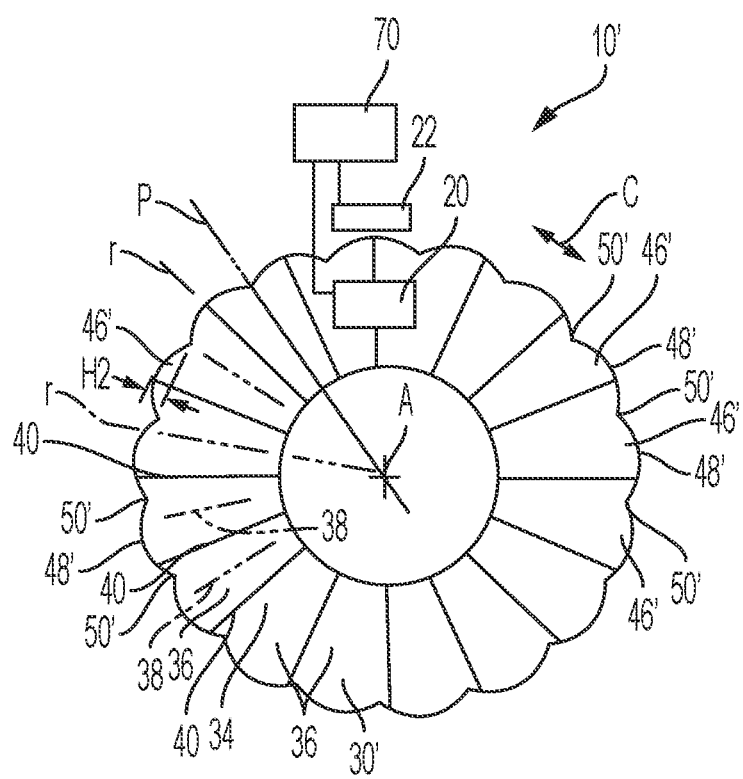
FIG. 5 is a view of a first axial face taken along lines 5-5 in FIG. 4.

Referring now to FIGS. 4 and 5, the second embodiment of the rotational position sensor arrangement 10' is shown, which encompasses the alternate location of the second wave profile 44' from the first embodiment of the rotational position sensor arrangement 10.

Here, the rotational position sensor arrangement 10' includes both the first and second sensors 20, 22, as well as a target disc 30' having the rotation axis A. The target disc 30' is formed of a metallic material. In this case, the first wave profile 34 is provided on the first axial face 32 as discussed above, and includes the first plurality of segments 36 each having a first axial offset peak 38 located on the radial line r extending from the axis A, and first valleys 40 located along radial lines r extending from the axis A on each side of the first peak 38. The first valleys 40 define boundaries between the first plurality of segments 36, as discussed above.

In this case, as shown in FIGS. 4 and 5, the second wave profile 44' is located on the radial face 52' of the target disc 30' and the second wave profile 44' includes a second plurality of segments 46' each having a second axially offset peak 48' located on a radial plane P extending from the axis A and second valleys 50' located along radial planes P extending from the axis A on each side of the second peak 48'. The second valleys 50' define boundaries between the second plurality of segments 46'. Here, the second sensor 22 is located adjacent to the second wave profile 44' at the radial face 52' of the target disc 30'.

As discussed above, the first and second sensors 20, 22 are connected to the controller 70 which is configured to provide a rotational position of the target disc 30' based on the respective first and second wave profiles 34, 44' altering a magnetic field of each of the first and second sensors 20, 22 that provide out-of-phase signals to the controller 70.

As discussed above, the number of the second plurality of segments 46' can be different from a number of the first plurality of segments 36. Alternatively, the number can be the same. Additionally, the heights H2 of the second plurality of segments 46' can be different from a height H1 of the first plurality of segments 36. The position of the first and second sensors 20, 22 can also be either aligned in a circumferential direction C or offset, depending upon the available space to locate the sensors for this rotational position sensor arrangement 10'.

Further, given the position of the second wave profile 44' on the radial face 52, it can be seen that the cord lengths L1 between the first valleys 40 of the first wave profile 34 will be different than the cord lengths L2 between the respective second valleys 50' of the second wave profile 44' based on the position of the first sensor 20 being radially inward from the position of the second sensor 22 in the event that the same number of segments 36, 46' are used.

As discussed above, either based on the different out-of-phase signals or different cord lengths L1, L2 that are detected by the first and second sensors 20, 22, the controller 70 can provide not only a position of the target disc 30', but also determine a speed and direction of rotation of the target disc 30'.

Figure 6:
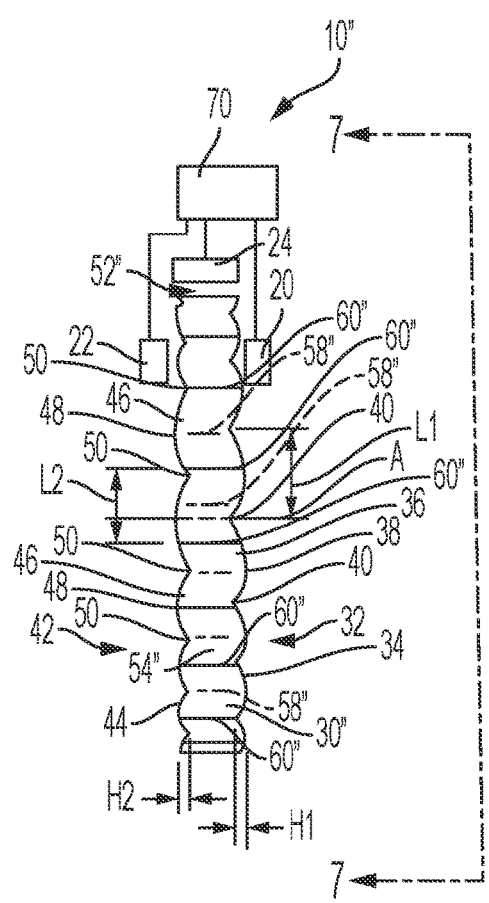
FIG. 6 is a side elevational view of a third embodiment of a rotational position sensor arrangement.
Figure 7:
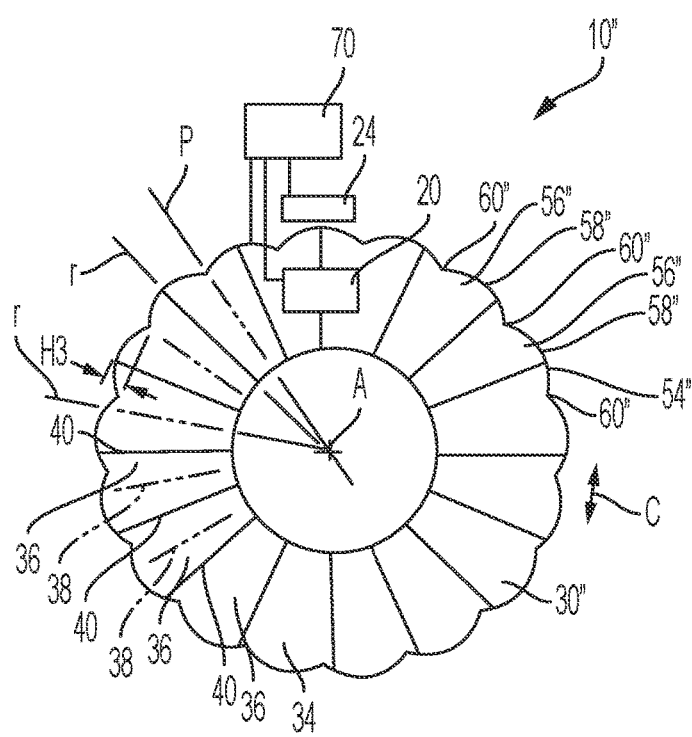
FIG. 7 is a view of a first axial face taken along lines 7-7 in FIG. 6.

Referring now to FIGS. 6 and 7, a third embodiment of the rotational position sensor arrangement 10" is shown. The third embodiment of the rotational position sensor arrangement 10" is similar to the first embodiment 10, and the target disc 30" includes the first and second wave profiles 34, 44, discussed above (the second wave profile 44 would be the same as shown in FIG. 3), and also includes a third wave profile 54" located on the radial face 52" of the target disc such that the first wave profile 34 is located on the first axial face of the target disc, the second wave profile 44 is located on the second axial face of the target disc, and the third wave profile 54" is located on the radial face 52" of the target disc. The third wave profile 54" has a third plurality of segments 56", each having a third axially offset peak 58" located on a radial plane P extending from the axis A, as well third valleys 60" located along radially planes P extending from the axis A on each side of the third peak 58". The third valleys 60" define boundaries between the third plurality of segments 56". A third sensor 24 is located adjacent to the third wave profile 54" and the third sensor 24 is also connected to the controller.

Using this third embodiment of the rotational position sensor arrangement 10", more accurate measurements of rotational position can be made with a simple disc arrangement 30". Here, a number of the third plurality of segments 56" can be different from a number of the first plurality of segments 36 or a number of the second plurality of segments 46. It is also possible for the number of the third plurality of segments 56" to be different from both the number of plurality of segments 36 and the number of the second plurality of segments 46.

It is also possible here for the respective heights H1, H2, H3 of the first, second, and third plurality of segments 36, 46, 56" to be different from one another or for the heights H1, H2, H3 to be equal or any two of these heights H1, H2, H3 to be equal with the other one being different. Depending upon the configuration of the first, second, and third wave profiles 34, 44, 54", the controller 70 can compare the out-of-phase signals from each of the first, second, and third sensors 20, 22, 24 to provide a more accurate reading of the position, as well as provide more accurate rotational speed values.

Additionally, using three wave profiles 34, 44, 54" allows the number of segments 36, 46, 56 in each of the wave profiles 34, 44, 54" to be reduced to provide for simpler configurations of the target disc 30". For example, a rotational position can be determined with high accuracy with four of the first segments 36, five of the second segments 46, and six of the third segments 56" located out of phase. This also allows for a reduced diameter of the target disc 30".

Figure 8:
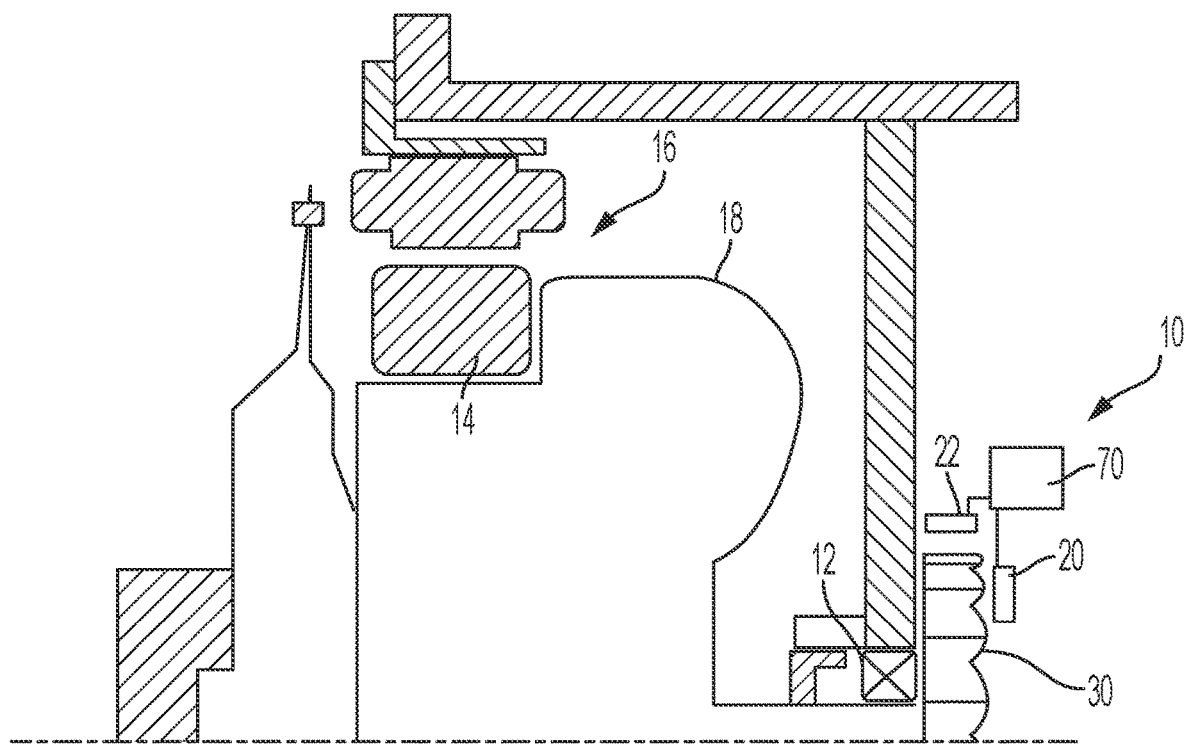
FIG. 8 is a side elevational view of a preferred application of the rotational position sensor arrangement used in connection with an E-motor of a motor vehicle.

Referring to FIG. 8, one preferred application of the rotational position sensor arrangement 10 is shown, with the arrangement 10 being used to provide speed and/or position data of the rotor 14 which is required for the vehicle controller, for example, to control the start and stopping of the E-motor 16. The sensor arrangements 10', 10" could be similarly used, depending on space availability for the sensor arrangement.

A method for detecting a rotational angle of at least one shaft or bearing 12 using the rotational position sensor arrangement 10 as shown in FIGS. 1-3 is also provided and is described in connection with FIG. 8. This would also apply to the second embodiment of the rotational position sensor arrangement 10'.

The method includes providing at least one shaft or bearing 12, and connecting the target disc 30 to the at least one shaft or bearing 12. The first and second sensors 20, 22 are aligned adjacent to the respective ones of the first wave profile and the second wave profile 34, 44, respectively. A rotational angle position of the at least one shaft or bearing ring 12 is detected based on field variations due to a difference in at least one of a size or location of the first and second wave profiles 34, 44 as they pass the first and second sensors 21, 22. Depending upon the configuration of the target disc 30, including a different number of segments 36, 46 in the first and second wave profiles 34, 44, the controller 70 can also determine a speed and direction of rotation of the at least one of the shaft or bearing ring 12.

The controller 70 can determine respective cord lengths L1, L2 and relative positions between adjacent ones of the valleys 40, 50 in each of the first and second wave profiles 34, 44. This can then be used by the controller 70 to determine the rotational angle position of the at least one of the shaft or bearing ring 12 based on the difference between the cord lengths L1, L2 and their positions.

The method can also encompass the third embodiment of the rotational position sensor arrangement 10" using the target disc 30" in which the third wave profile 54 is located on the radial face 52 of the target disc 30" and includes the third plurality of segments 56", each having the third axially offset peak 58" located on a radial plane P that extends from the axis A and the third valleys 60" located along radial planes P extending from the axis A on each side of the third peak 58. These third valleys 60" define boundaries between the third plurality of segments 56", as discussed above. Here, the input of the third sensor 24 based on the third wave profile 54" altering a magnetic field of the third sensor 24 provides a further out-of-phase signal to the controller 70 in order to enhance the accuracy of both the rotational angle position as well as the speed calculated by the controller 70 based on a differential between the out-of-phase signals from the first, second, and third sensors 20, 22, 24.

In the disclosed embodiments of the target disc 30, 30', 30", the first plurality of segments 36 have a truncated pie-shape wedge appearance with a rounded protrusion. However, other shapes are possible. In the embodiments of the target disc 30, 30", the second plurality of segments 46 also have a truncated pie-shape wedge appearance with a rounded protrusion, although other shapes are also possible. In the second and third embodiments of the target disc 30', 30" the wave profile on the radial face 52', 52" is formed of partial cylindrical segments between the valleys, although other shapes could be utilized.

Based on the differential between the signals produced by the first and second sensors 20, 22 based on the different number and circumferential spacing of the respective first and second plurality of segments, the exact rotational position of the target disc 30, 30', 30" can be determined at any location, even starting from a standstill position of the target disc 30, 30', 30". The sensitivity of the rotational position can be enhanced by providing a greater number of the first plurality of segments 36 and second plurality of segments 46, 46'. In one embodiment, the number of the first plurality of segments can be at least 10, and more preferably at least 17, and possibly 37 or more. The number of the second plurality of segments 46, 46' is in each case preferably one less than the number of the first plurality of segments 36. Additionally, providing a further plurality of segments 56" along with the third sensor 24 provides further gradation in order to enhance position sensing. The number of the third plurality of segments 56" is preferably one more than the number of the first plurality of segments 36.

Using the rotational position sensor arrangement 10, 10', 10", the controller 70 can determine a rotational position, a speed and direction of rotation of the target disc 30, 30', 30" based on the frequency of the oscillating signals produced by at least one of the first or second sensors 20, 22 as well as the phase differentiation provided by the different number of the first plurality of segments 36 from the second plurality of segments 46, 46', with further refinement made possible by also using the phase differentiation provided by the third sensor 24, when present.

The present rotational position sensor arrangements 10, 10', 10" allow for reduced manufacturing cost and less axial packaging space, along with flexibility of the sensor positions allowing the sensor arrangement to be adapted to existing spaces, while at the same time providing a robust sensor at a reduced cost in comparison to other known sensors

Having thus described the presently preferred embodiments in detail, it is to be appreciated and will be apparent to those skilled in the art that many physical changes, only a few of which are exemplified in the detailed description, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope that is indicated by the appended claims rather than by the foregoing description, and all alternate embodiments and changes to this embodiment which come within the meaning and range of equivalency of said claims are therefore to be embraced therein.

LIST OF REFERENCE NUMERALS

10 Sensor arrangement
12 Bearing
14 Rotor
16 E-motor
20 First sensor
22 Second sensor
24 Third sensor
30, 30', 30" Target disc
32 First axial face 34 First wave profile
36 First plurality of segments
38 First axially offset peak(s)
40 First valleys
44 Second wave profile
46 Second plurality of segments
48 Second axially offset peak(s)
50 Second valleys
52 Radial face
54 Third wave profile
56 Third plurality of segments
58 Third axially offset peak(s)
60 Third Valleys
70 Controller
A Axis
R1 Radial distance
R2 Second radial distance
P Radial Plane
r Radial line
C Circumferential direction
H1 Axial height
H2 Second axial height
L1, L2 Chord length

What is claimed is:

1. A rotational position sensor arrangement, comprising:
first and second sensors;
a target disc having a rotation axis and being formed of a metallic material, the target disc comprising
a first wave profile located on a first axial face of the target disc, the first wave profile including a first plurality of segments, each having a first axially offset peak located on a radial line extending from the axis and first valleys located along radial lines extending from the axis on each side of the first peak, the first valleys define boundaries between the first plurality of segments, and
a second wave profile located on one of a second axial face or a radial face of the target disc, the second wave profile including a second plurality of segments, each having a second axially offset peak located on a radial plane extending from the axis and second valleys located along radial planes extending from the axis on each side of the second peak, the second valleys define boundaries between the second plurality of segments;
wherein the first sensor is located adjacent to the first wave profile and the second sensor is located adjacent to the second wave profile; and
a controller connected to the first and second sensors that is configured to provide a rotational position of the target disc based on the respective first and second wave profiles altering a magnetic field of each of the first and second sensors that provide out-of-phase signals to the controller.

2. The rotational position sensor arrangement of claim 1, wherein the first and second sensors are offset in a circumferential direction.

3. The rotational position sensor arrangement of claim 1, wherein the first and second sensors are aligned in a circumferential direction.

4. The rotational position sensor arrangement of claim 1, wherein the controller is configured to read a first chord length between two adjacent ones of the respective first valleys based on the signals from the first sensor, and the controller is further configured to read a second chord length between two adjacent ones of the respective second valleys based on signals from the second sensor.

5. The rotational position sensor of claim 1, wherein the controller is further configured to determine a speed and direction of rotation of the target disc.

6. The rotational position sensor arrangement of claim 1, wherein a number of the second plurality of segments is different from a number of the first plurality of segments.

7. The rotational position sensor arrangement of claim 1, wherein a height of the second plurality of segments is different from a height of the first plurality of segments.

8. The rotational position sensor arrangement of claim 1, further comprising:
a third wave profile located on the other of the second axial face or the radial face of the target disc from the second wave profile, the third wave profile including a third plurality of segments, each having a third axially offset peak located on a radial plane extending from the axis and third valleys located along radial planes extending from the axis on each side of the third peak, the third valleys define boundaries between the third plurality of segments; and
a third sensor is located adjacent to the third wave profile, the third sensor being connected to the controller.

9. The rotational position sensor arrangement of claim 8, wherein a number of the third plurality of segments is different than a number of the first plurality of segments or a number of the second plurality of segments.

10. The rotational position sensor arrangement of claim 8, wherein a number of the third plurality of segments is different than a number of the first plurality of segments and a number of the second plurality of segments.

11. A method of detecting a rotational angle position of at least one shaft or bearing ring using the rotational position sensor arrangement of claim 1, the method comprising:
providing at least one shaft or bearing ring,
connecting the target disc to the at least one shaft or bearing ring,
aligning the first and second sensors adjacent to respective ones of the first wave profile and the second wave profile; and
detecting a rotational angle position of the at least one shaft or bearing ring based on a field variance due to a difference in at least one of a size or location of the first and second wave profiles as they pass the first and second sensors.

12. The method of claim 11, further comprising:
the controller determining a respective chord length between adjacent ones of the valleys in each of the first and second wave profiles; and
the controller determining the rotational angle position of the at least one shaft or bearing ring based on a differential between the chord lengths.

13. The method of claim 11, wherein the determining of the rotational angle position is for a rotor of an e-motor for a motor vehicle.

14. The method of claim 11, wherein a number of the second plurality of segments is different from a number of the first plurality of segments, and the controller determines the rotational angle position, a speed, and a direction of rotation of the at least one shaft or bearing ring.

15. The method of claim 11, wherein a third wave profile is located on the other of the second axial face or the radial face of the target disc from the second wave profile, the third wave profile including a third plurality of segments, each having a third axially offset peak located on a radial plane extending from the axis and third valleys located along radial planes extending from the axis on each side of the third peak, the third valleys define boundaries between the third plurality of segments; and
  a third sensor is located adjacent to the third wave profile, the third wave profile altering a magnetic field of the third sensor to provide a further out-of-phase signal to the controller.

\* \* \* \* \*